United States Patent
Mautino et al.

(10) Patent No.: US 8,097,660 B2
(45) Date of Patent: Jan. 17, 2012

(54) RIGID POLYURETHANE FOAMS WITH LOW THERMAL CONDUCTIVITY AND A PROCESS FOR THEIR PRODUCTION

(75) Inventors: V. Michael Mautino, Finleyville, PA (US); Steven L. Schilling, Pittsburgh, PA (US); Edward E. Ball, Weirton, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 1047 days.

(21) Appl. No.: 11/513,767

(22) Filed: Aug. 31, 2006

(65) Prior Publication Data

US 2008/0058436 A1  Mar. 6, 2008

(51) Int. Cl.
  *C08G 18/00*  (2006.01)
(52) U.S. Cl. ......... 521/170; 521/155; 521/172; 521/174
(58) Field of Classification Search .................. 521/131, 521/174, 170, 172, 155
  See application file for complete search history.

(56) References Cited

U.S. PATENT DOCUMENTS

| | | | |
|---|---|---|---|
| 3,085,085 A | 4/1963 | Wismer et al. | 260/209 |
| 3,153,002 A | 10/1964 | Wismer et al. | 260/2.5 |
| 3,222,357 A | 12/1965 | Wismer et al. | 260/209 |
| 4,430,490 A | 2/1984 | Doerge | 528/77 |
| 5,461,084 A | 10/1995 | Doerge | 521/167 |
| 6,846,850 B2 | 1/2005 | Schilling et al. | 521/174 |
| 2004/0143027 A1 | 7/2004 | Schilling et al. | 521/109.1 |
| 2005/0020709 A1 | 1/2005 | Schilling et al. | 521/175 |
| 2005/0113470 A1* | 5/2005 | Zhu et al. | 521/50 |
| 2005/0148677 A1 | 7/2005 | Elsken et al. | 521/155 |

* cited by examiner

*Primary Examiner* — Mark Eashoo
*Assistant Examiner* — Melissa Rioja
(74) *Attorney, Agent, or Firm* — Lyndanne M. Whalen; Noland J. Cheung

(57) ABSTRACT

Rigid closed-cell polyurethane foams with low k-factors are produced by reacting an organic polyisocyanate with an amine-based polyether polyol and a polyester polyol in the presence of a catalyst and a hydrofluorocarbon blowing agent, preferably, HFC-245fa. It is preferred that no water be added to the reaction mixture.

4 Claims, No Drawings

RIGID POLYURETHANE FOAMS WITH LOW THERMAL CONDUCTIVITY AND A PROCESS FOR THEIR PRODUCTION

FIELD OF THE INVENTION

The present invention relates to a process for the production of rigid polyurethane foams with low thermal conductivity using a hydrofluorocarbon ("HFC") as the primary blowing agent and a minor amount (i.e., less than 0.3% by weight, based on total weight of foam forming mixture) of water and to the foams produced by this process.

BACKGROUND OF THE INVENTION

Processes for the production of rigid polyurethane foams are known. See, for example, U.S. Pat. Nos. 3,085,085; 3,153,002; 3,222,357; and 4,430,490.

One of the key components used to produce any foam is the blowing agent. While a number of blowing agents are known, the blowing agent most commonly used by U.S. appliance manufacturers to produce rigid foams for insulation applications today is 1,1,1,3,3-pentafluoropropane (commonly referred to as HFC 245fa). While HFC 245fa does make it possible to produce rigid polyurethane foams with advantageous physical properties, further property improvements, especially improvements in the k-factor or insulating ability, in view of increasing energy costs and the possibility of further tightening of Government energy efficiency requirements, are still being sought.

It would therefore be advantageous to develop a process for producing rigid polyurethane foams with lower thermal conductivities than the currently available HFC 245fa blown foam using no additional blowing agent(s) and commercially available materials without the need for additional equipment or process controls.

One approach to developing such a process which has not, to date, been explored to any great extent is the use of higher density foams blown with a hydrofluorocarbon blowing agent. This may be attributed to the fact that lighter weight insulating foams have been considered highly desirable for applications such as refrigerator insulation.

U.S. Pat. No. 5,461,084 discloses polyurethane foams with core densities between 2.10 and 2.36 pounds per cubic foot (pcf). The foams produced in this patent with an HFC blowing agent and no added water, however, were made with relatively large amounts of the HFC blowing agent.

SUMMARY OF THE INVENTION

It is an object of the present invention to provide a process for the production of rigid polyurethane foams with lower k-factors than those of the foams which are currently available.

It is a further object of the present invention to provide a process for the production of rigid polyurethane foams which are useful in the production of refrigeration units and other applications in which insulation is critical.

It is also an object of the present invention to provide a rigid polyurethane foam having good insulation properties and a density of from 2.0 to 4.0 pounds per cubic foot (i.e., from 0.032 to 0.064 gm/cm$^3$).

These and other objects which will be apparent to those skilled in the art are accomplished by reacting an organic polyisocyanate with an isocyanate-reactive component that includes both an amine-initiated polyether polyol and a polyester polyol having a low residual water content (i.e., a water content of less than 0.3% by weight, based on weight of polyester polyol) in the presence of an HFC blowing agent and a catalyst in the presence of no more than 0.3% by weight, based on total weight of foam-forming mixture, of water to form a foam having a density of from 2 to 4 pounds per cubic foot (i.e., from 0.032 to 0.064 gm/cm$^3$).

DETAILED DESCRIPTION OF THE PRESENT INVENTION

It has been found that the insulation properties of rigid polyurethane foams are significantly improved when an HFC and optionally, a minor amount of water are used as the foaming agent in amounts such that the product foam has a density of from 2 to 4 pounds per cubic foot in a system made up of commercially available polyurethane-forming reaction components. These foams use an HFC as the primary, or preferably, the sole blowing agent. A minor amount of water, preferably water present as residual water in the polyol(s) of the isocyanate-reactive component and little or no added water are included in the isocyanate-reactive component.

The present invention is directed to a process for the production of rigid polyurethane foams with an HFC as either the primary or the sole blowing agent and to the foams produced by this process. In the process of the present invention, (a) an organic isocyanate is reacted with (b) an isocyanate-reactive component that includes (1) an amine-based polyether polyol which preferably has an average molecular weight of at least about 150, more preferably from about 250 to about 1,000, and preferably, an epoxide content of from about 60 to about 95% by weight, more preferably from about 65 to about 85% by weight based on the total weight of the amine initiator plus the epoxide, and (2) a polyester polyol which preferably has an average molecular weight of from about 280 to about 640, more preferably, from about 350 to about 580, in the presence of (c) an HFC blowing agent, preferably, a $C_3$-$C_5$ polyfluorohydrocarbon, most preferably, 1,1,1,3,3-pentafluoro-propane ("HFC-245fa") and (d) a catalyst, and optionally, (e) a surfactant, at an isocyanate index of from about 1.0 to about 3.0, preferably from about 1.1 to about 2.0. The product foams have a density of greater than 2.0, preferably, from 2.0 to 4.0, more preferably, from 2.2 to 3.8 pounds per cubic foot and k-factors of less than 0.130 BTU-in./hr.ft$^2$F at 75° F., preferably less than 0.128 BTU-in/hr-ft$^2$-° F. at 75° F., most preferably, less than or equal to 0.126 BTU-in/hr-ft$^2$-° F. at 75° F.

Any of the known organic isocyanates, modified isocyanates or isocyanate-terminated prepolymers made from any of the known organic isocyanates may be used in the practice of the present invention. Suitable isocyanates include aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, isomers of hexahydro-toluene diisocyanate, isophorone diisocyanate, dicyclo-hexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-diphenyl-propane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenyl-polyisocyanates.

Undistilled or a crude polyisocyanate may also be used in making polyurethanes by the process of the present invention. The crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates. Suitable undistilled or crude polyisocyanates are disclosed in U.S. Pat. No. 3,215,652.

Modified isocyanates are obtained by chemical reaction of diisocyanates and/or polyisocyanates. Modified isocyanates useful in the practice of the present invention include isocyanates containing ester groups, urea groups, biuret groups, allophanate groups, carbodiimide groups, isocyanurate groups, uretdione groups and/or urethane groups. Preferred examples of modified isocyanate include prepolymers containing NCO groups and having an NCO content of from about 25 to about 35 wt %, preferably from about 28 to about 32 wt %, particularly those based on polyether polyols or polyester polyols and diphenylmethane diisocyanate. Processes for the production of these prepolymers are known in the art.

The most preferred polyisocyanates for the production of rigid polyurethane foams in accordance with the present invention are methylene-bridged polyphenyl polyisocyanates and prepolymers of methylene-bridged polyphenyl polyisocyanates having an average functionality of from about 1.8 to about 3.5 (preferably from about 2.0 to about 3.1) isocyanate moieties per molecule and an NCO content of from about 25 to about 35% by weight, due to their ability to cross-link the polyurethane.

The polyisocyanate is generally used in an amount such that the isocyanate index (i.e., the ratio of equivalents of isocyanate groups to equivalents of isocyanate-reactive groups) is from about 1.0 to about 3.0, preferably from about 1.10 to about 2.0.

The polyols employed in the process of the present invention are amine-initiated polyether polyols and polyester polyols having a residual water content no greater than 0.3% by weight, preferably, less than 0.2% by weight, most preferably, less than or equal to 0.1% by weight.

The amine-initiated polyether polyols generally have functionalities of from about 3 to about 5 and molecular weights of at least about 150, preferably from about 250 to about 1,000, most preferably from about 300 to about 800. These amine-based polyols are prepared by reacting an amine, polyamine or aminoalcohol and optionally other initiators (with or without water) with propylene oxide and optionally, ethylene oxide, and also optionally, in the presence of an alkaline catalyst. If an alkaline catalyst is utilized, the removal or neturalization of the catalyst can be accomplished by the treatment of the product with an acid so as to neutralize the alkaline catalyst, extraction of the catalyst, or the use of ion exchange resins. Such processes are described in U.S. Pat. No. 5,962,749. U.S. Pat. Nos. 2,697,118 and 6,004,482 disclose a suitable process for the production of such amine-initiated polyols.

Examples of suitable amine initiators include: ammonia, aminoalcohols, ethylene diamine, diethylene triamine, hexamethylene diamine and aromatic amines such as toluene diamine. The preferred initiator is a mixture of one or more isomers of toluene diamine, with ortho-toluene diamine (a mixture of 2,3-toluene diamine and 3,4-toluene diamine) being most preferred.

It is preferred that the amine initiator be reacted with propylene oxide, or ethylene oxide, followed by propylene oxide. If used, the ethylene oxide may be used in an amount up to 60% by weight of the total alkylene oxide used. The propylene oxide is generally used in an amount of from about 40 to about 100% by weight of the total alkylene oxide employed, preferably from about 60 to about 100% by weight. The total amount of alkylene oxide used is selected so that the product polyol will have an average molecular weight of at least about 150, preferably from about 250 to about 1,000.

The amine-based polyether polyol is included in the isocyanate-reactive component in an amount of 20 to 75% by weight, preferably, from about 40 to 60% by weight, based on the total isocyanate-reactive component.

Any of the known polyester polyols having a functionality of at least 2, preferably, from 2.0 to 2.5, and a number average molecular weight of from 280 to 640, preferably, from 350 to 580 may be used in the practice of the present invention. The polyester polyol is generally included in the isocyanate-reactive component in an amount of 25 to 80% by weight, based on total weight of isocyanate-reactive component, preferably, from about 40 to about 60% by weight.

Suitable polyester polyols include the reaction products of polyhydric alcohols (preferably dihydric alcohols to which some trihydric alcohols may be added) and polybasic (preferably dibasic) carboxylic acids. In addition to these polycarboxylic acids, corresponding carboxylic acid anhydrides or polycarboxylic acid esters of lower alcohols or mixtures thereof may also be used to prepare the polyester polyols useful in the practice of the present invention. The polycarboxylic acids may be aliphatic, cycloaliphatic, aromatic and/or heterocyclic and they may be substituted, e.g. by halogen atoms, and/or unsaturated. Examples of suitable polycarboxylic acids include: succinic acid; adipic acid; suberic acid; azelaic acid; sebacic acid; phthalic acid; isophthalic acid; maleic acid; trimellitic acid; fumaric acid; dimeric and trimeric fatty acids such as oleic acid, which may be mixed with monomeric fatty acids. Examples of suitable carboxylic acid anhydrides include phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; and maleic acid anhydride. Examples of polycarboxylic acid esters include dimethyl terephthalates and bis-glycol terephthalate. Suitable polyhydric alcohols include: ethylene glycol; 1,2- and 1,3-propylene glycol; 1,3- and 1,4-butylene glycol; 1,6-hexanediol; 1,8-octanediol; neopentyl glycol; cyclohexanedimethanol; (1,4-bis(hydroxymethyl)cyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethylolpropane. The polyesters may also contain a portion of carboxyl end groups. Polyesters of lactones, e.g. -caprolactone or hydroxyl carboxylic acids such as ω-hydroxycaproic acid, may also be used.

Other known isocyanate-reactive materials, such as polyols (e.g., polyether polyols which are not based on an amine) and polyamines known to be useful in the production of rigid polyurethane foams may, optionally, be used in combination with the required amine-based polyether polyol and polyester polyol. When used, these optional isocyanate-reactive materials are present in an amount which is no greater than 20%, preferably less than about 10% of the total amount of isocyanate-reactive component.

Any of the known HFC blowing agents containing from 3 to 5 carbon atoms may be employed in the process of the present invention. $C_3$ and $C_4$ polyfluoroalkanes and polyfluoroalkenes are preferred. Mixtures of such polyfluoroalkanes may, of course, also be used.

Examples of preferred polyfluoroalkanes include: 1,1,2,2,3-pentafluoropropane (HFC-245ca); 1,1,2,3,3-pentafluoropropane (HFC-245ea); 1,1,1,3,3-pentafluoropropane (HFC-245fa); pentafluoropropylene (HFC-2125a); 1,1,1,3-tetrafluoro-propane; tetrafluoropropylene (HFC-2134a); difluoropropylene (HFC-2152b); 1,1,1,3,3-pentafluoro-n-butane (HFC-365mfc); 1,1,1,3,3,3-hexafluoropropane; 2,2,4,4-tetrafluorobutane; 1,1,1,3,3,3-hexafluoro-2-methylpropane; 1,1,1,3,3,4-hexafluorobutane; 1,1,1,4,4,4-hexafluorobutane (HFC-356mffm); and mixtures thereof.

The most preferred polyfluoroalkanes are the pentafluoropropanes and pentafluorobutanes. Any of the known isomers of pentafluoropropane and pentafluorobutane may be used in the present invention as the blowing agent alone or in a mixture. Examples of such pentafluoropropane isomers include: 1,1,2,2,3-pentafluoropropane (HFC-245ca); 1,1,2,3,3-pentafluoropropane (HFC-245ea); and 1,1,1,3,3-pentafluoropropane (HFC-245fa). The most preferred pentafluoropropane isomer is 1,1,1,3,3-pentafluoropropane and the most preferred pentafluorobutane isomer is 1,1,1,3,3-pentafluorobutane. The pentafluoropropanes are particularly preferred because they produce foams having particularly advantageous k-factors of 0.130 BTU-in./hr.ft.$^{2}$° F. or less at 75° F.

The blowing agent is generally included in the foam-forming mixture in an amount of from about 6 to about 17% by weight, based on the total weight of the foam formulation, preferably from about 8 to about 15% by weight.

Water is most preferably not added to the foam-forming reaction mixtures of the present invention. If, however, water is added, it should generally be added in an amount such that the total water content of the foam forming mixture (including residual water present in the polyol(s)) is no greater than 0.3% by weight, preferably no greater than 0.2%, most preferably, no greater than 0.1% by weight, based on total weight of the foam-forming mixture.

Any of the catalysts known to be useful in the production of rigid polyurethane foams may be employed in the process of the present invention. Tertiary amine catalysts and organometallic catalysts are particularly preferred. Specific examples of suitable tertiary amine catalysts include: pentamethyldiethylenetriamine, N,N-dimethylcyclohexylamine, N,N',N"-dimethylamino-propylhexahydrotriazine, tetramethylethylenediamine, tetramethylbutylene diamine and dimethylethanolamine. Pentamethyldiethylenetriamine, N,N',N"-dimethylamino-propylhexahydrotriazine, and N,N-dimethylcyclohexylamine are particularly preferred tertiary amine catalysts. Specific examples of organometallic catalysts include dibutyltin dilaurate, dibutyltin diacetate, stannous octoate, potassium octoate, potassium acetate, and potassium lactate, Materials which may optionally be included in the foam-forming mixtures of the present invention include: chain extenders, crosslinking agents, surfactants, pigments, colorants, fillers, antioxidants, flame retardants, and stabilizers. Surfactants are a preferred additive.

The isocyanate and isocyanate-reactive materials are used in quantities such that the equivalent ratio of isocyanate groups to isocyanate-reactive groups is from about 1.0 to about 3.0, preferably from about 1.1 to about 2.0.

Having thus described our invention, the following examples are given as being illustrative thereof. All parts and percentages given in these examples are parts by weight and percentages by weight, unless otherwise indicated.

EXAMPLES

The materials used in the following examples were as follows:

| | |
|---|---|
| POLYOL A: | An aromatic amine-initiated polyether polyol having a hydroxyl number of about 388 mg KOH/g and a functionality of 4 which is available from Bayer MaterialScience under the designation Multranol 8114. |
| POLYOL B: | A polyether polyol prepared by alkoxylating a sucrose, propylene glycol and water starter having a hydroxyl number of about 470 mg KOH/g which is commercially available from Bayer MaterialScience under the designation Multranol 9196. |
| POLYOL C: | An aromatic polyester polyol blend having a hydroxyl number of about 240 mg KOH/g and a functionality of about 2.0 which is commercially available from Stepan Company under the designation Stepanpol PS 2502A. |
| POLYOL D: | A phthalic anhydride and diethylene glycol polyester polyol having a hydroxyl number of about 240 mg KOH/g and a functionality of about 2.0 which is commercially available from Stepan Company under the designation Stepanpol PS 2352. |
| POLYOL E: | A phthalic anhydride and diethylene glycol polyester polyol having a hydroxyl number of about 315 mg KOH/g and a functionality of about 2.0 which is commercially available from Stepan Company under the designation Stepanpol PS 3152. |
| POLYISO-CYANATE (NCO): | a modified polymeric MDI having an NCO content of approximately 30.5% which is commercially available from Bayer MaterialScience LLC under the name Mondur 1515. |
| CATALYST A (CAT. A): | Pentamethylenediethylenetriamine, a tertiary amine catalyst which is commercially available from Air Products and Chemicals, Inc. under the name Polycat 5. |
| CATALYST B (CAT. B): | Dimethylcyclohexylamine, a tertiary amine catalyst which is commercially available from Air Products and Chemicals, Inc. under the name Polycat 8. |
| CATALYST C (CAT. C): | a tertiary amine catalyst which is commercially available from Air Products and Chemicals, Inc. under the name Polycat 41. |
| CATALYST D (CAT. D): | dibutyltin dilaurate, which is commercially available from Air Products and Chemicals, Inc. under the name Dabco T-12. |
| CATALYST E (CAT. E): | potassium 2-ethylhexoate in diethylene glycol, which is commercially available from Air Products and Chemicals, Inc. under the name Dabco K-15. |
| CATALYST F (CAT. F): | 33% solution of 1,4-diaza-bicyclo[2.2.2]octane in dipropylene glycol, which is commercially available from Air Products and Chemicals, Inc. under the name Dabco 33LV. |
| SURFACTANT (Surf.): | A silicone surfactant that is commercially available from Air Products and Chemicals, Inc. under the name Dabco DC-5357. |
| HFC-245fa: | 1,1,1,3,3-pentafluoropropane, which is commercially available from Honeywell International Inc. under the name Enovate 3000. |

Examples 1-18

All foam evaluations were performed using the following the general procedure:

The masterbatch (composed of polyol, surfactant, catalyst, water, and HFC 245fa) was prepared ahead of time and both it and the isocyanate were cooled to 10° C. prior to use. The desired amount of masterbatch and isocyanate were weighed into an appropriate container and mixed with a high speed stirrer for 5 seconds before being poured into the desired foam container or mold.

To determine gel times, a total of 250 g of material (masterbatch plus isocyanate) was mixed and poured into a cardboard cup having a volume of about 2.5 liters. The rising foam was repeatedly touched with a thin stick until the foam adhered to the stick and a string formed as the stick was pulled away. The time elapsed from start of mixing until the first string was observed was recorded as the gel time.

To prepare panels for testing, a 25" high×13" wide×2" thick metal mold with a detachable lid was used. The mold was heated to 120° F. (50° C.) before the desired amount of material was poured into the mold and allowed to rise. The minimum fill weight was first determined by allowing the foam to rise above the top of the open mold. After curing, the excess material was trimmed off and the remaining foam weighed. The minimum fill density was then calculated by dividing this foam weight by the volume of the mold. Test panels are prepared in a similar manner, except that the mold's lid was attached before the rising foam reached the top. The foam was left in the mold for 3.5 minutes before being removed. Core foam samples were cut from the panel for testing.

K-factors were measured on the center core section at 75° F. (24° C.) mean temperatures on a Lasercomp FOX 200 heat flow meter. Closed cell contents were determined using a Micrometrics Accupyc 1330 gas pycnometer according to ASTM Method D-6226. Core foam densities were determined using ASTM Method D-1622.

The formulations used and properties of the foams produced from those formulations are reported in the Table.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A rigid, closed-cell polyurethane foam having a density of from 2.0 to 4.0 pounds/cubic foot and a k-factor of less than 0.130 BTU-in./hr.ft.$^{2\circ}$ F. at 75° F. which is produced by reacting
   a) an isocyanate-reactive component consisting of:
      (1) an toluenediamine-initiated polyether polyol and
      (2) a polyester polyol

| Formulation | Ex. 1* | Ex. 2* | Ex. 3* | Ex. 4* | Ex. 5 | Ex. 6 | Ex. 7 | Ex. 8 | Ex. 9 |
|---|---|---|---|---|---|---|---|---|---|
| POLYOL A (pbw) | 38.51 | 40.65 | 39.77 | 59.16 | 44.58 | 43.80 | 29.54 | 29.87 | 28.48 |
| POLYOL B (pbw) | 14.00 | 14.78 | 14.46 | | | | | | |
| POLYOL C (pbw) | 17.50 | 18.48 | 18.08 | | | | | | |
| POLYOL D (pbw) | | | | 14.79 | 29.72 | 29.20 | 44.31 | 44.80 | 42.72 |
| POLYOL E (pbw) | | | | | | | | | |
| SURF (pbw) | 2.83 | 2.90 | 2.90 | 2.90 | 2.90 | 2.90 | 2.90 | 2.90 | 2.90 |
| CATALYST A (pbw) | 1.06 | | | | | | | | |
| CATALYST B (pbw) | | | | | | | | | |
| CATALYST C (pbw) | 0.53 | | | | | | | | |
| CATALYST D (pbw) | | 0.60 | | 0.35 | 0.35 | | | 0.35 | |
| CATALYST E (pbw) | | 0.60 | 0.60 | 0.60 | 0.60 | 0.60 | 0.60 | 0.60 | 1.10 |
| CATALYST F (pbw) | | | 2.40 | | | 1.85 | 1.30 | | 1.40 |
| Water (pbw) | 0.90 | | | | | | | | |
| HFC-245fa (pbw) | 24.67 | 22.00 | 21.80 | 22.20 | 21.85 | 21.65 | 21.35 | 21.48 | 23.40 |
| TOTAL | 100.00 | 100.00 | 100.00 | 100.00 | 100.00 | 100.00 | 100.00 | 100.00 | 100.00 |
| NCO 1515 | 98.20 | 88.66 | 86.74 | 90.15 | 87.03 | 85.51 | 82.98 | 83.92 | 100.47 |
| Gel Time(seconds) | 50 | 31 | 32 | 31 | 32 | 31 | 30 | 30 | 31 |
| Min Fill Density (pcf) | 1.85 | 2.55 | 2.55 | 2.53 | 2.48 | 2.52 | 2.46 | 2.42 | 2.40 |
| Packed Density (pcf) | 2.04 | 2.69 | 2.65 | 2.64 | 2.58 | 2.62 | 2.58 | 2.57 | 2.49 |
| % Pack | 10.1 | 5.4 | 4.0 | 4.5 | 4.3 | 4.0 | 4.9 | 6.0 | 4.0 |
| Core Density (pcf) | 1.76 | 2.32 | 2.28 | 2.27 | 2.25 | 2.22 | 2.21 | 2.20 | 2.16 |
| % Closed Cell (%) | 90.6 | 90.2 | 90.5 | 90.9 | 90.3 | 90.0 | 91.1 | 90.3 | 89.8 |
| k-Factor (75°), BTU-in./hr.ft.$^2$ ° F. | 0.132 | 0.132 | 0.130 | 0.134 | 0.126 | 0.126 | 0.125 | 0.126 | 0.126 |

| Formulation | Ex. 10 | Ex. 11 | Ex. 12* | Ex. 13* | Ex. 14* | Ex. 15 | Ex. 16* | Ex. 17 | Ex. 18* |
|---|---|---|---|---|---|---|---|---|---|
| POLYOL A (pbw) | 29.54 | 14.69 | | 70.30 | 29.81 | 27.66 | 25.79 | 31.38 | 33.32 |
| POLYOL B (pbw) | | | | | | | | | |
| POLYOL C (pbw) | | | | | | | | | |
| POLYOL D (pbw) | | 58.75 | 72.95 | | | | | | |
| POLYOL E (pbw) | 44.31 | | | | 44.72 | 41.49 | 38.68 | 47.06 | 49.98 |
| SURF (pbw) | 2.90 | 2.90 | 2.90 | 2.90 | 2.93 | 2.72 | 2.53 | 3.08 | 3.27 |
| CATALYST A (pbw) | | | | | | | | | |
| CATALYST B (pbw) | | | | | | | | | |
| CATALYST C (pbw) | | | | | | | | | |
| CATALYST D (pbw) | | | | | | | | | |
| CATALYST E (pbw) | 0.60 | 1.40 | 1.80 | 0.70 | 0.73 | 0.56 | 0.52 | 0.64 | 0.68 |
| CATALYST F (pbw) | 1.30 | 1.00 | 0.70 | 4.00 | 1.55 | 1.22 | 1.13 | 1.38 | 1.47 |
| Water (pbw) | | | | | 0.87 | | | | |
| HFC-245fa (pbw) | 21.35 | 21.26 | 21.65 | 22.10 | 19.40 | 26.35 | 31.35 | 16.46 | 11.28 |
| TOTAL | 100.00 | 100.00 | 100.00 | 100.00 | 100.01 | 100.00 | 100.00 | 100.00 | 100.00 |
| NCO (pbw) | 82.98 | 97.19 | 107.44 | 87.91 | 105.76 | 82.97 | 83.00 | 88.14 | 93.61 |
| Gel Time(seconds) | 34 | 29 | 30 | 30 | 31 | 37 | 38 | 24 | 23 |
| Min Fill Density (pcf) | 2.44 | 2.46 | 2.42 | 2.55 | 2.27 | 2.03 | 1.77 | 3.02 | 4.54 |
| Packed Density (pcf) | 2.60 | 2.62 | 2.62 | 2.67 | 2.54 | 2.20 | 1.98 | 3.35 | 4.87 |
| % Pack | 6.7 | 6.5 | 8.2 | 4.6 | 11.6 | 8.5 | 11.8 | 10.8 | 7.4 |
| Core Density (pcf) | 2.37 | 2.27 | 2.35 | 2.36 | 2.27 | 2.00 | 1.67 | 3.03 | 4.10 |
| % Closed Cell (%) | 92.0 | 90.3 | 89.6 | 90.4 | 91.4 | 91.1 | 88.9 | 93.0 | 89.4 |
| k-Factor (75°), BTU-in./hr.ft.$^2$ ° F. | 0.124 | 0.128 | 0.129 | 0.128 | 0.134 | 0.127 | 0.131 | 0.126 | 0.142 |

*Comparative Example
pbw = parts by weight with
  b) a diisocyanate or polyisocyanate
in the presence of
  c) 1,1,1,3,3-pentafluoropropane, and
  d) a catalyst
in the presence of less than 0.3% by weight of water, based on total foam-forming mixture.

2. The foam of claim 1 in which a)(1) is an ortho-toluene diamine-initiated polyether polyol.

3. The foam of claim 1 in which no water is added to the reaction mixture.

4. A process for the production a rigid, closed-cell polyurethane foam having a density of from 2 to 4 pounds/cubic foot and a k-factor of less than 0.130 BTU-in./hr.ft.$^2$° F. at 75° F. comprising reacting a) an isocyanate-reactive component consisting of:
    (1) an ortho-toluenediamine-initiated polyether polyol and
    (2) a polyester polyol
with
  b) a diisocyanate or polyisocyanate
in the presence of
  c) 1,1,1,3,3-pentafluoropropane,
  d) a catalyst, and
  e) water.

* * * * *